US007377456B2

(12) United States Patent
Wang

(10) Patent No.: US 7,377,456 B2
(45) Date of Patent: May 27, 2008

(54) WATER FLOW CONTROL STRUCTURE OF A WATER GUN

(76) Inventor: Hsin-Fa Wang, No. 68, Mou Tan Lane, Shao An Li Lu Kang Town, Chang Hua Hsien (TW)

(*) Notice: Subject to any disclaimer, the term of this patent is extended or adjusted under 35 U.S.C. 154(b) by 210 days.

(21) Appl. No.: 11/442,709

(22) Filed: May 30, 2006

(65) Prior Publication Data

US 2007/0278442 A1 Dec. 6, 2007

(51) Int. Cl.
*F16K 31/60* (2006.01)

(52) U.S. Cl. ....................... 239/526; 251/241; 251/285

(58) Field of Classification Search ................ 251/241, 251/239, 238, 285; 239/526, 525, 583
See application file for complete search history.

(56) References Cited

U.S. PATENT DOCUMENTS 1,345,496 A * 7/1920 Keeler ........................ 251/285
1,643,969 A * 10/1927 Tittemore et al. ........... 239/526
1,824,017 A * 9/1931 Bramsen et al. ............ 251/285
1,924,637 A * 8/1933 Carpenter ................... 251/285
2,149,932 A * 3/1939 Zippel ........................ 239/527
2,899,169 A * 8/1959 Klingler ..................... 239/583
4,483,483 A * 11/1984 Grime ........................ 251/285
6,454,187 B1 * 9/2002 Wang ......................... 239/526
6,641,062 B1 * 11/2003 Chen .......................... 239/526
7,007,868 B1 * 3/2006 Chen .......................... 239/526

* cited by examiner

*Primary Examiner*—John Bastianelli
(74) *Attorney, Agent, or Firm*—Egbert Law Offices

(57) ABSTRACT

The water flow control structure of a water gun includes a movable control tube, stepwise positioning unit, oblique guide and resilient component. When the control tube is moved by the control component, it is turned by the oblique guide and stepwise positioning unit. Each time the first guide of the control tube coordinates with the position of the stepwise positioning unit, it makes the space between the stopper head of the control tube and the water control outlet of the water holder close or open in different degrees to control water flow. The entire control structure is hidden inside the water gun. The repeated movements of the control component can switch the water flow mode, which is convenient and practical.

7 Claims, 10 Drawing Sheets

WATER FLOW CONTROL STRUCTURE OF A WATER GUN

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a water flow control structure of a water gun, and more particularly to a device with a rotating cylinder with an oblique guide and stepwise positioning unit to adjust the water flow and its on and off feature.

BACKGROUND OF THE INVENTION

When using the conventional water gun, the water gun usually controls the on and off status of water flow by a predetermined pressing part or trigger. However, when people use the water gun and when the distance of the target is different one from another, the need to adjust the water flow arises. The conventional water gun has only two modes, on and off; therefore, water flow control is achieved by pressing the trigger. It is a challenge to maintain a certain amount of the water flow, and the hand often becomes sore from holding the trigger for a long period of time. Thus, the water gun becomes inconvenient when used for a long time.

The industry has developed some structures that can control water flow. For example, a common type of structure is an assisting button added on the outside of the trigger. This assisting button usually has a gear to limit the trigger's pressing angle. To adjust the water flow, the assisting button is pressed when the user desires to restore the trigger's position. The structure that is used to adjust the water flow, such as the assisting button and gear, is placed on the external side of the water gun; therefore, the damage rate is higher during actual use. Moreover, because the water gun is often used for garden irrigation or cleaning, the water gun is soiled with mud and sand. The mud and sand easily gets inside the gear and fills the empty part of the structure, which affects the normal positioning effect of the gear.

Thus, to overcome the aforementioned problems of the prior art, it would be an advancement in the art to provide an improved structure that can significantly improve the efficacy.

To this end, the inventor has provided the present invention of practicability after deliberate design and evaluation based on years of experience in the production, development and design of related products.

BRIEF SUMMARY OF THE INVENTION

The improved fact of the present invention is explained herein.

The water flow control structure of the present invention primarily consists of the design of the movable control tube 30, stepwise positioning unit 50, oblique guide 60, and resilient component 70. When the control tube 30 is moved by the control component 20, it is turned by the movement of the oblique guide 60 and stepwise positioning unit 50. The first guide 41 of the control tube 30 faces a different position 51, 51B, 51C of the stepwise positioning unit 50 to control the space between the stopper head 32 of the control tube 30 and the water control outlet 14 of the water holder 13 so as to control the water flow. The entire control structure is hidden inside the water gun, which solves the disadvantages of the conventional structures, such as avoiding damage from outside forces, reducing the damage rate, avoiding contact with mud and sand, and keeping the movement functioning normally.

The water flow control of the water gun of the present invention uses the repeat movement of the control component 20 to switch the water flow control, which is convenient and practical to use.

Although the invention has been explained in relation to its preferred embodiment, it is to be understood that many other possible modifications and variations can be made without departing from the spirit and scope of the invention as hereinafter claimed

DETAILED DESCRIPTION OF THE INVENTION

Figure 1:
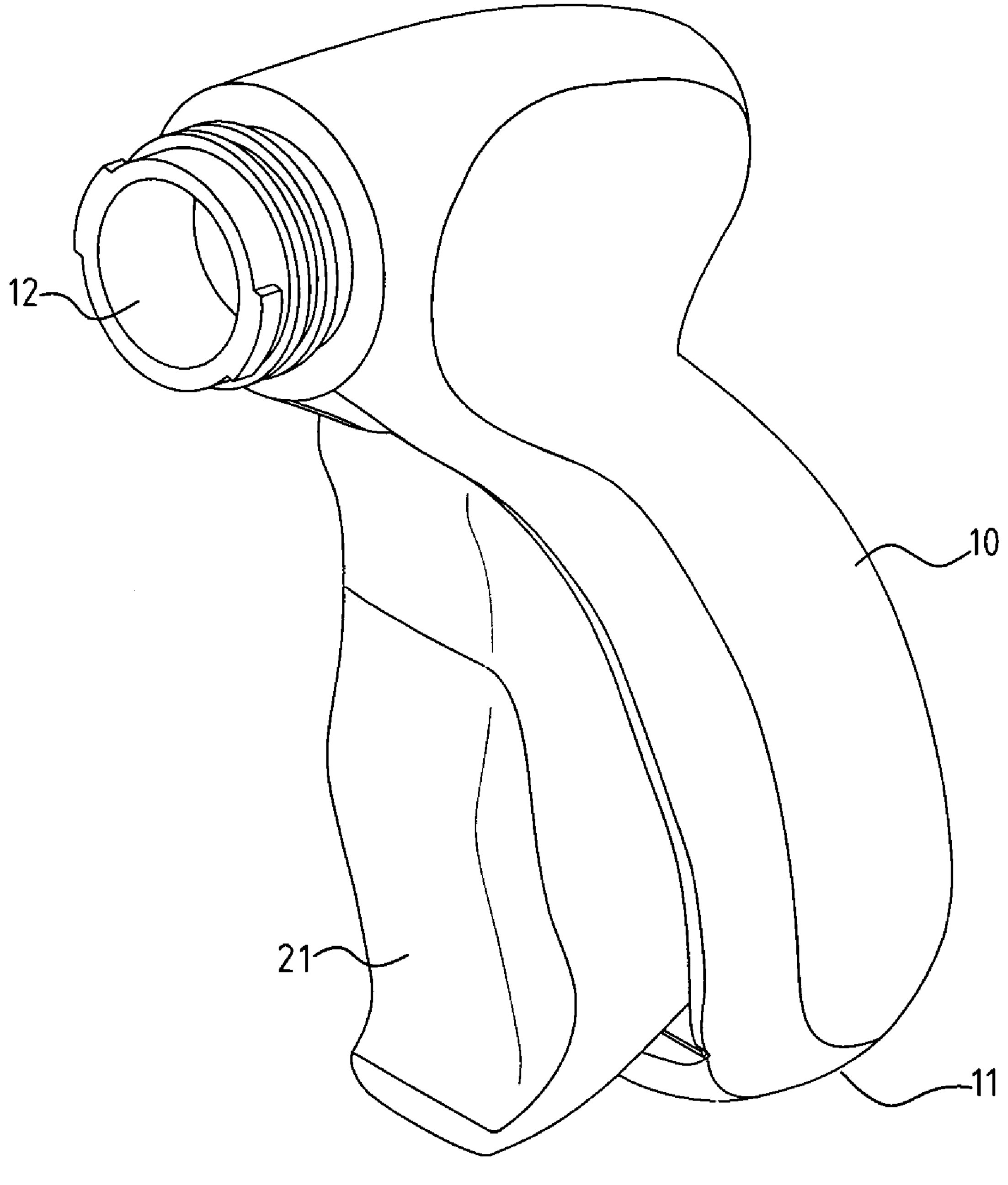
FIG. 1 shows an assembled, perspective view of the preferred embodiment of the present invention.
Figure 2:
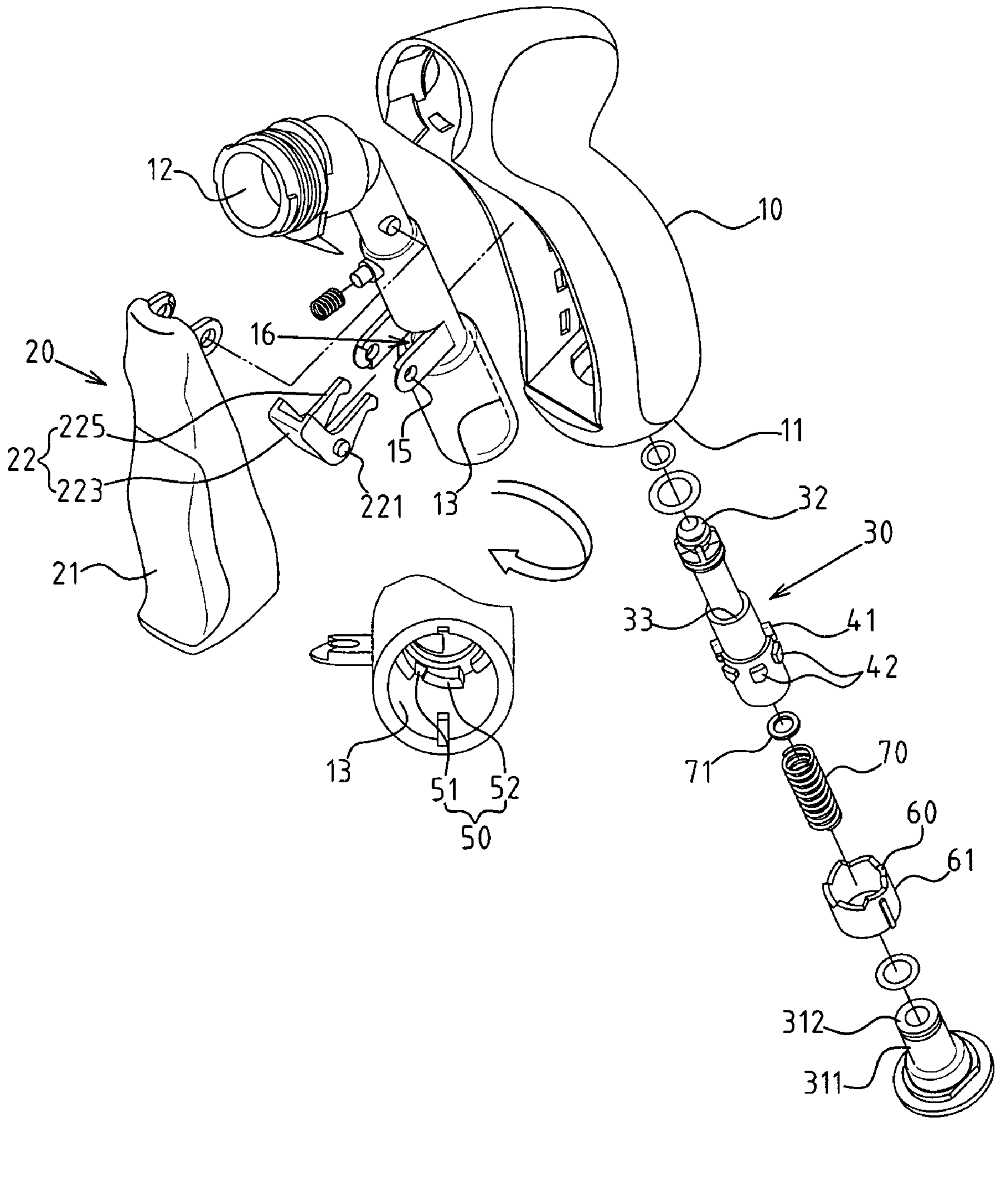
FIG. 2 shows an exploded, perspective view of the preferred embodiment of the present invention.

The features and the advantages of the present invention will be more readily understood upon a thoughtful deliberation of the following detailed description of a preferred embodiment of the present invention with reference to the accompanying drawing.

As shown in FIGS. 1, 2, 3, 4, there is a water flow control structure embodied in the present invention. This embodiment is used for description only. The scope of the invention is determined by the claims and is not restricted by this description of the structure when applying for the patent.

The water flow control structure is placed on the predetermined part of the water gun to control the on and off features and the amount of the water flow.

A water gun 10 includes a water inlet 11, a water outlet 12, a water holder 13 between the water inlet 11 and the water outlet 12, and a control component 20 placed on a predetermined part of the water gun 10.

The flow control structure includes a control tube 30, which is to be placed inside the water holder 13 of the water gun 10. The control tube 30 can be rotated and moved up and down. The control tube 30 can be moved by the control component 20 of the water gun 10 and can be moved down from the first location to the second location. A water channel 31 is placed inside the control tube 30. The control tube 30 faces the end of water outlet 12 that has a stopper head 32 to stop a water control outlet 14 inside the water holder 13 to shut the water off. A first guide 41 and second guide 42 are placed on the outside of the control tube 30. The first guide 41 can be made by two protruding blocks that are at an 180 degree angle. The second guide 42 can be made by several protruding blocks, and the bottom of each protruding block can have an oblique surface.

A stepwise positioning unit 50 is placed inside the water holder 13, and the stepwise positioning unit 50 includes several sets of positioning slots 51 that have different heights. There is an oblique surface 52 on the positioning unit 50. When the control tube 30 is at the first location, it makes the first guide 41 of the control tube 30 correspond to the stepwise positioning unit 50.

An oblique guide 60 has several sets of rings that are placed inside the water holder 13. When the control tube 30 is moved to the second positioning, it makes the second guide 42 of the control tube 30 be guided by the oblique guide 60, which makes the control tube 30 turn to a predetermined angle. The oblique guide 60 of the present invention is placed on the ring base 61, and the ring base 61 is positioned in the water holder 13.

Figure 4:
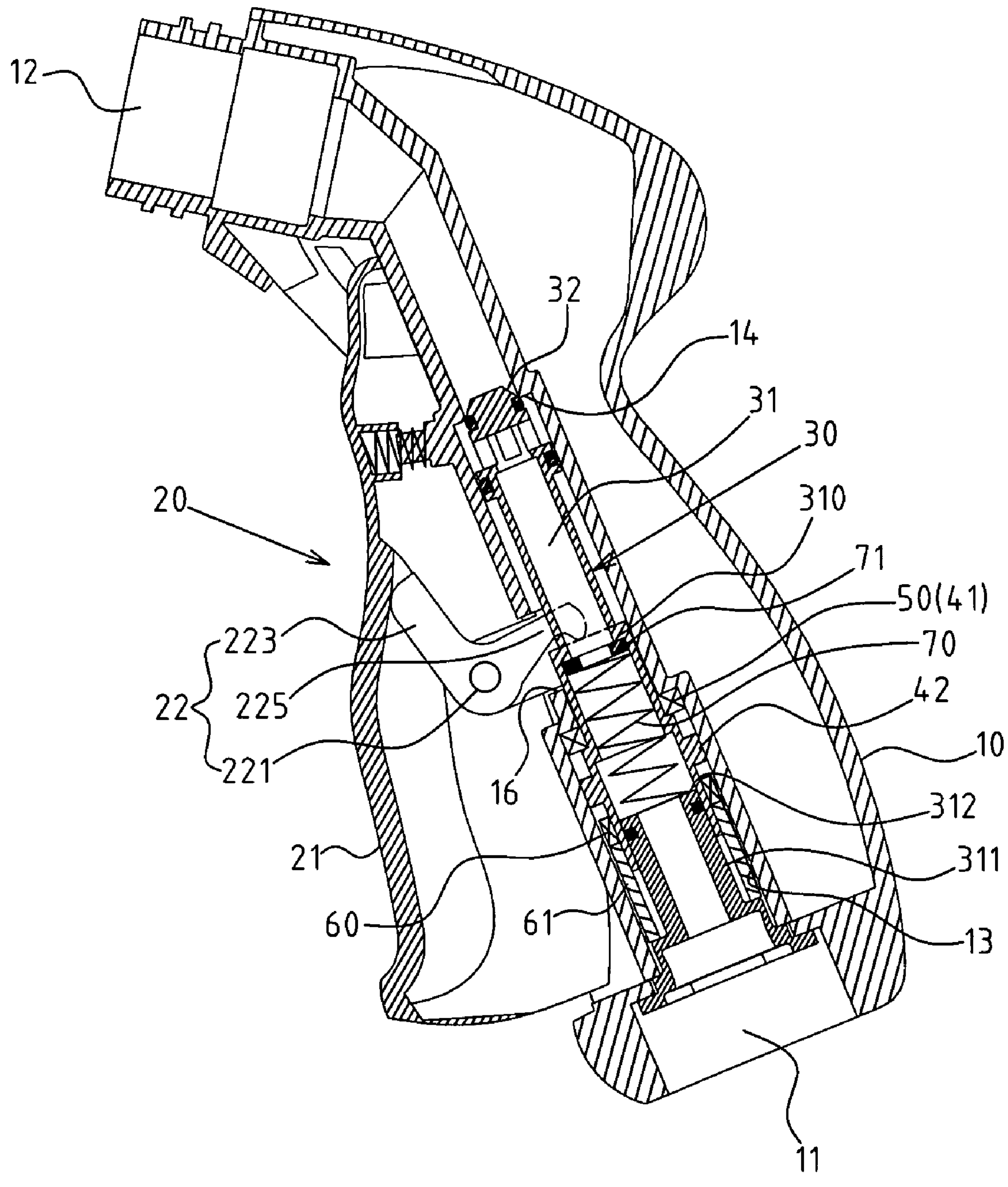
FIG. 4 shows an assembled sectional view of the preferred embodiment of the present invention.

A resilient component 70 restores the control tube 30 from the second position to the first position. The resilient component 70 can be a spring, so that its top end is pushed against the limit edge 310 (as shown by FIG. 4) by the water channel 31 of the control tube 30. A spacer 71 can be placed on this end so that when the control tube is rotating, the fraction is reduced and becomes smoother. The bottom of the resilient component 70 is pushed against a top end 312 of a positioning base 311 at the bottom of the water channel 31.

The control component 20 of the water gun 10 includes a press handle 21 and a linkage lever 22. The press handle 21 has its top end placed on the top end of the front side of the water gun 10, so that the bottom end of the press handle 21 can be pressed. The linkage lever 22 can be connected to the through hole 13 in the middle of the water gun 10, and the linkage lever 22 includes a vertical rod 223 and two horizontal bars 225. Thus, the middle of the water gun 10 has a through hole 16 for the horizontal bar 225 of the linkage lever 22 to insert, and a shoulder 33 is placed on the outside of the control tube 30 for the horizontal bar 225 to be placed on. When the bottom of the press handle 21 is pressed in, the vertical rod 223 of the linkage lever 22 moves its horizontal bar 225, and further moves the control tube 30 from the first position to the second position.

Through the above structure and design, the operation of the present invention is explained herein.

Figure 7:
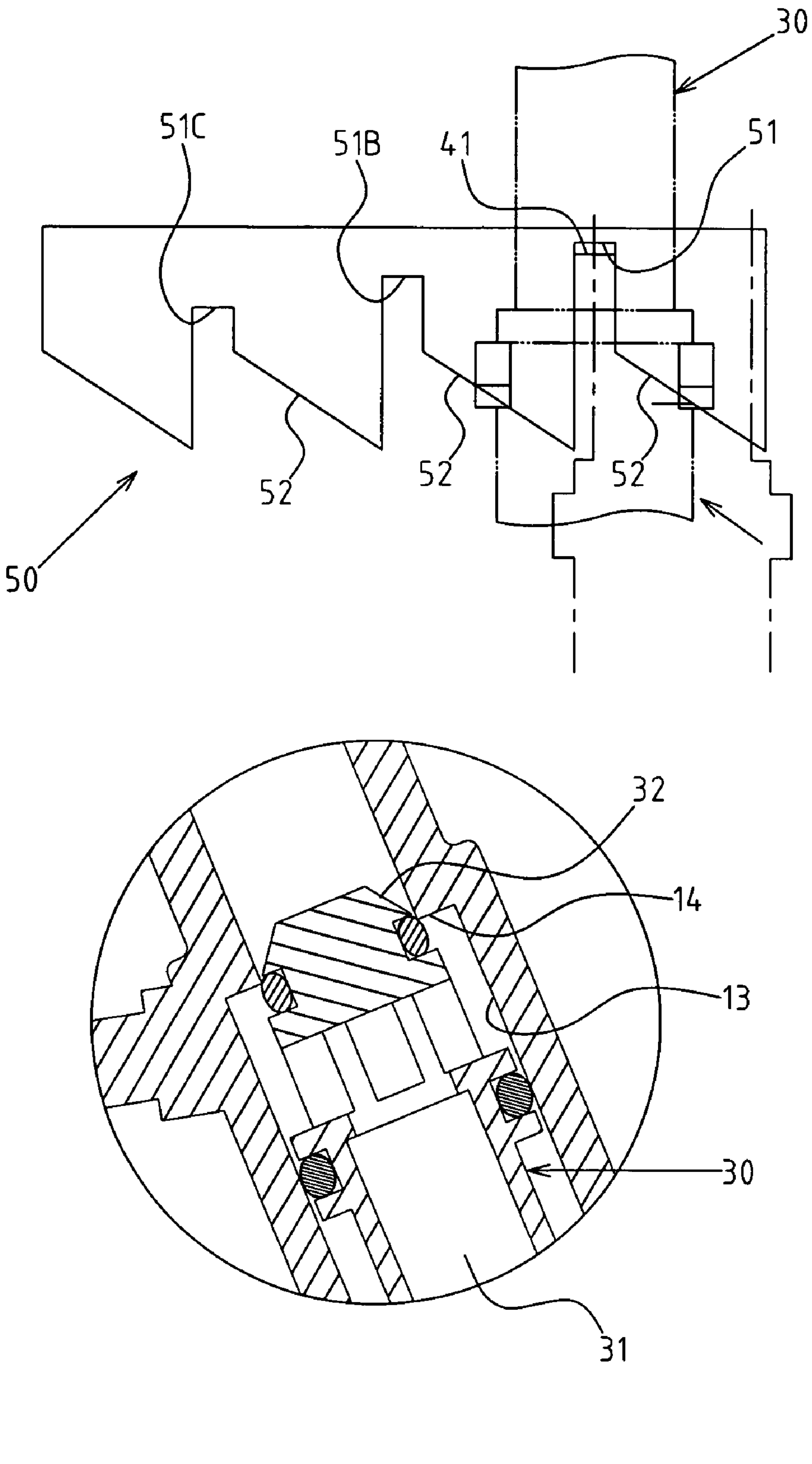
FIG. 7 shows a schematic view and isolated sectional view of the position of the first guide of the control tube of the present invention facing the stepwise positioning unit, which is in the off position.

As shown in FIG. 4, when the user has not pressed the press handle 21 of the control component 20, the control tube 30 is supported by the resilient component 70 and moves to the first position mentioned above. At this time, the opening between the stopper head 32 at the top of the control tube 30 and the water control outlet 14 of the water holder 13 decide the correspondence of the first guide 41 and the stepwise positioning unit 50, as shown in FIG. 7. When the first guide 41 of the control tube 30 is corresponding to the highest positioning slot 51 of the stepwise positioning unit 50, the space between the stopper head 32 of the control tube 30 and the water control outlet 14 of the water holder 13 (as shown at the bottom of the FIG. 7) is closed.

Figure 3:
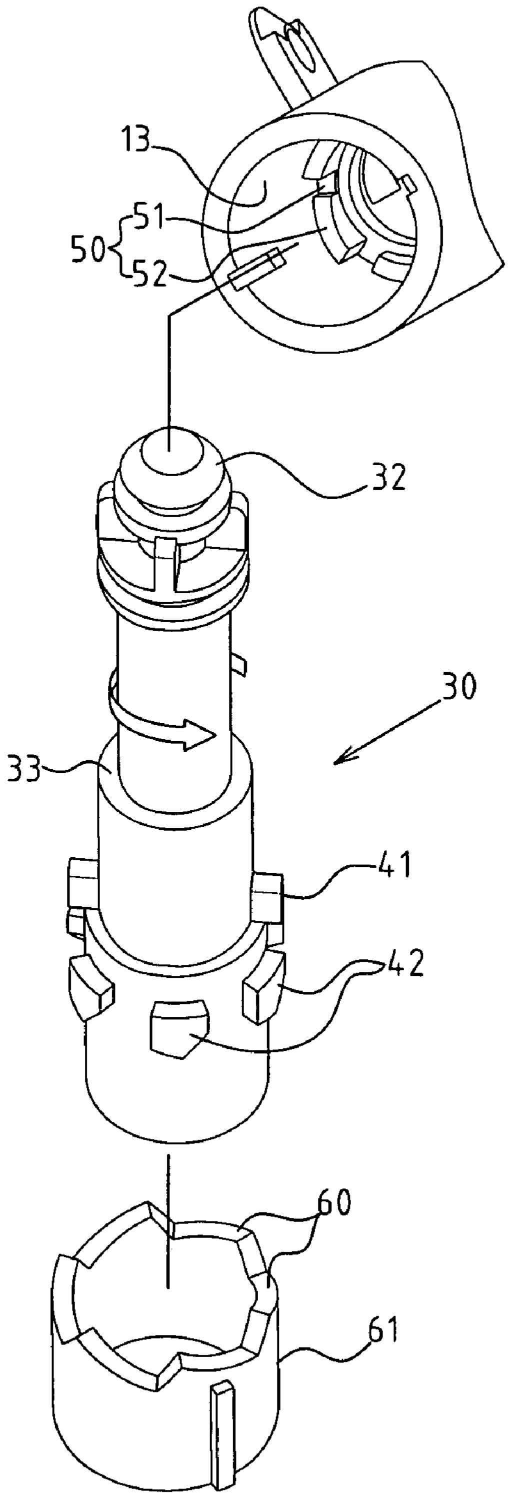
FIG. 3 shows a partial exploded perspective view of the preferred embodiment of the present invention.
Figure 5:
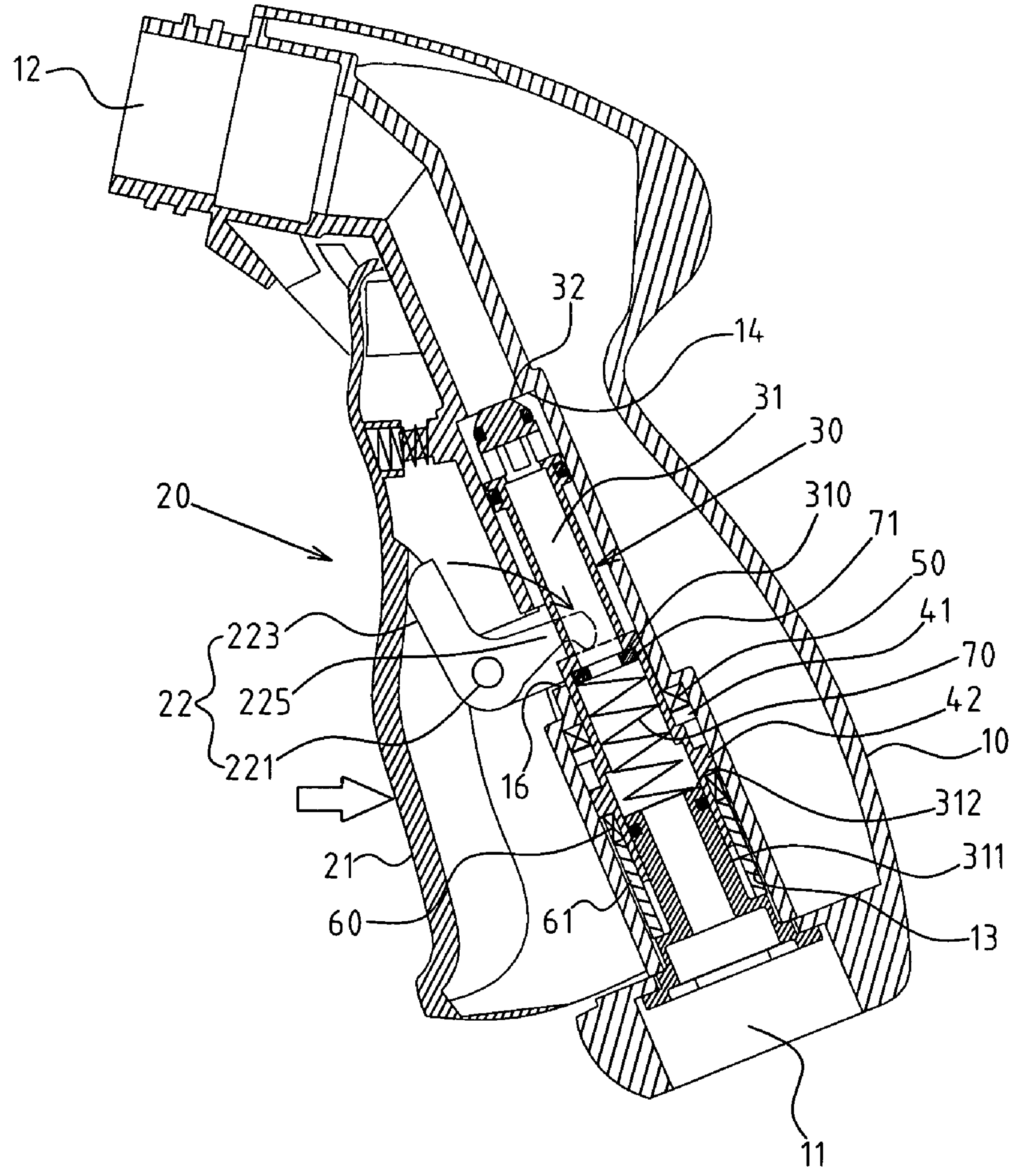
FIG. 5 shows an assembled sectional view of the preferred embodiment of the present invention, which is the control tube moving downward.
Figure 6:
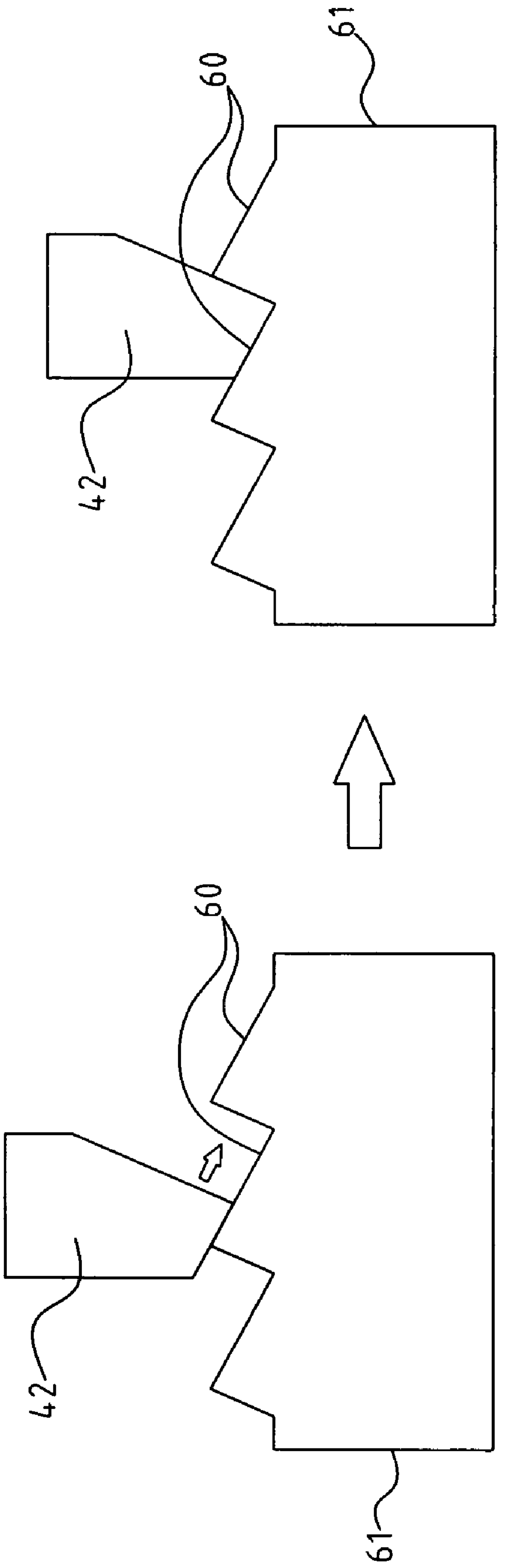
FIG. 6 shows a schematic view of the oblique guide of the present invention guiding the second guide.
Figure 8:
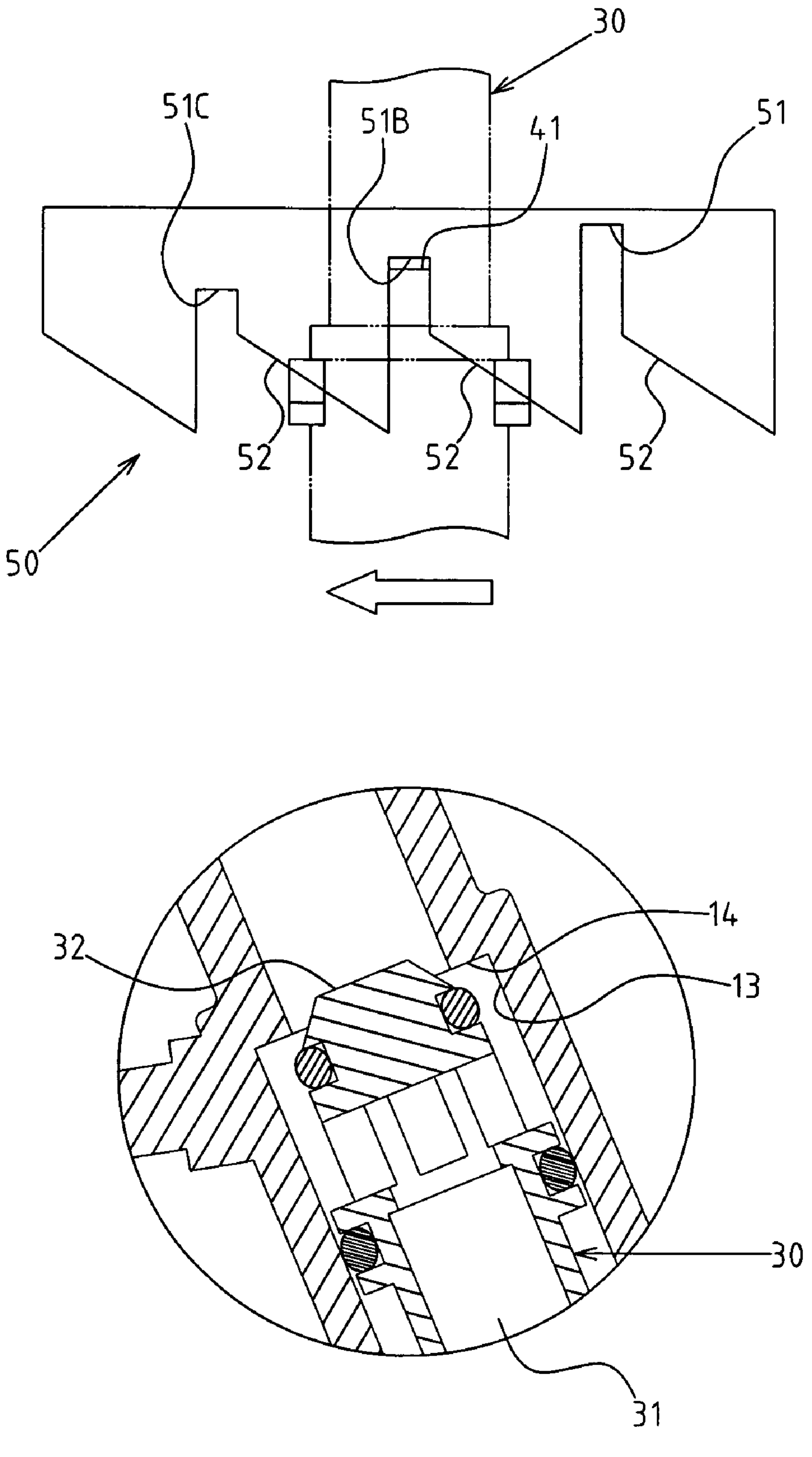
FIG. 8 shows another a schematic view and isolated sectional view of the position of the first guide of the control tube of the present invention facing the stepwise positioning unit, which is for a small amount of the water flow.
Figure 9:
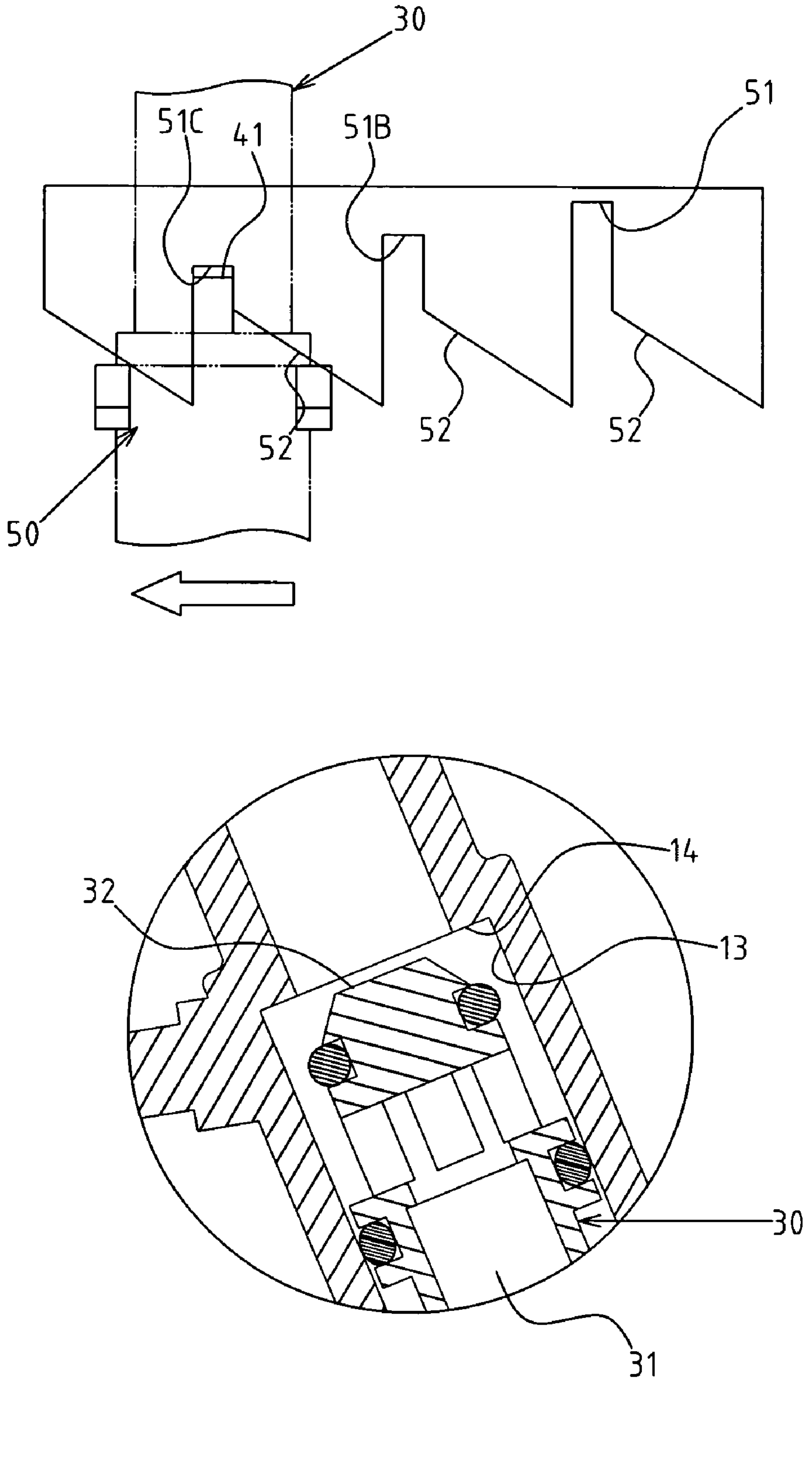
FIG. 9 shows still another schematic view and isolated sectional view of the position of the first guide of the control tube of the present invention facing the stepwise positioning unit, which is for a large amount of water flow.
Figure 10:
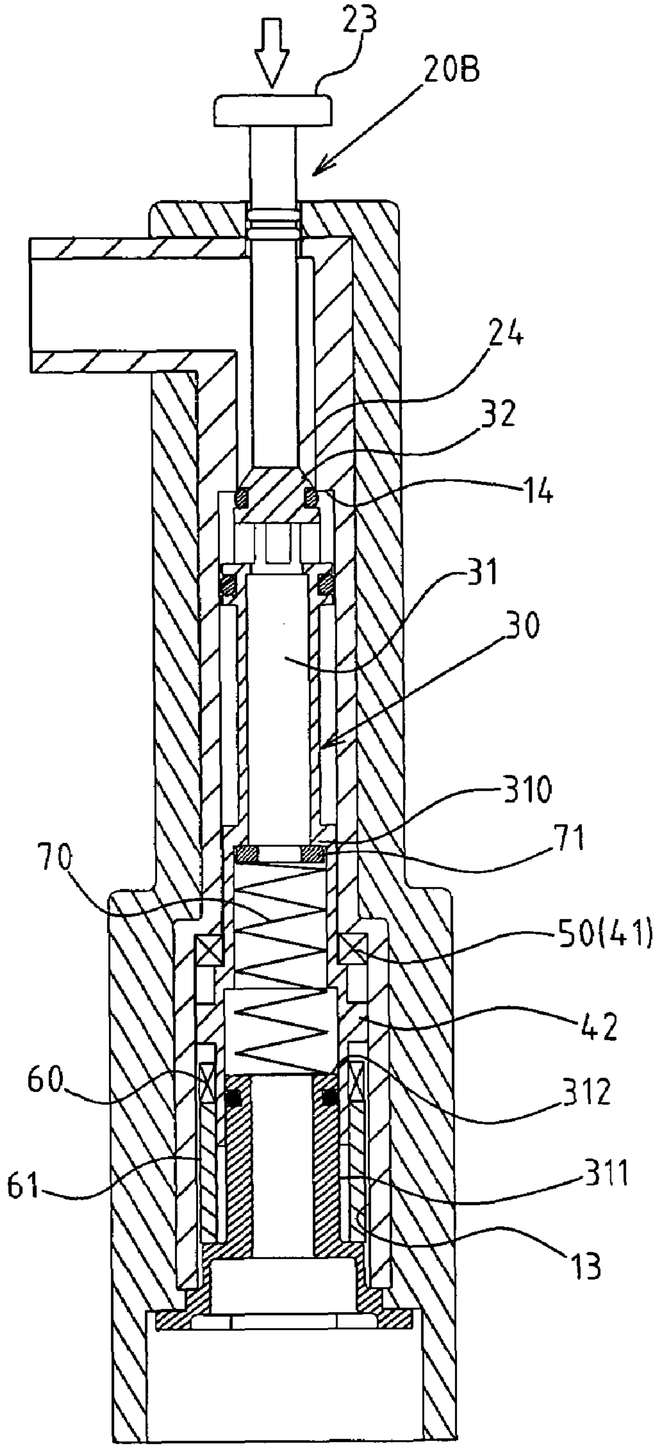
FIG. 10 shows a sectional view of another embodiment of the control component of the present invention.

As shown in FIG. 5, when the user presses the press handle 21 of the control component 20, the linkage lever 22 is turned and moved. Its horizontal bar 225 presses down and moves the control tube 30 down to the second location mentioned above, and presses resilient component 70 to restore resilience. At this time, the second guide 42 of the control tube 30 will touch the oblique guide 60 at the lower part of the water holder 13. As shown in FIGS. 3 and 6, the second guide 42 will be guided obliquely by the oblique guide 60 and will control the control tube 30 to turn to a predetermined angle. This function makes the first guide 41 turn to another angle. When the control tube 30 is moved to the first location, it faces the positioning slot 51B of the stepwise positioning unit 50 at another height, as shown in FIGS. 7, 8, and 10 for this movement. The top figure shown in FIG. 8 is the first guide 41 of the control tube 30 facing the positioning slot 51B of the stepwise positioning unit 50 at the second highest position. This makes the small opening between the stopper head 32 of the control tube 30 and the water control outlet 14 of the water holder 13 for the small amount of the water flow (as shown in FIG. 8). The top figure of FIG. 9 is the first guide 41 of the control tube 30 facing the positioning slot 51C of the stepwise positioning unit 50 at the lowest position. This makes the large opening between the stopper head 32 of the control tube 30 and the water control outlet 14 of the water holder 13 for a large amount of water flow (as shown in FIG. 9). The stepwise positioning unit 50 is lined up in the circular shape, so that when the user presses and releases the press handle 21, the mode of water flow is alternating in order as shown in FIG. 7, 8, 9 (which means: off->small amount of water flow->large amount of water flow->off,).

As shown in FIG. 10, the control component 20B of the water gun 10 can be a press handle 23, and the press handle 23 can be placed on the top of the water gun. The bottom 24 of the press handle 23 can be connected to the stopper head 32 of the control tube 30 after going through the water holder 13. When it lowers the press handle 23, it drives the control tube 30 down. As for the movement of the control tube 30, it is moved by the stepwise positioning unit 50 and oblique guide 60 as same as embodiments mentioned above, therefore, it is not repeated.

I claim:

1. A water flow control structure of a water gun, said water flow control structure being placed on a predetermined part of said water gun to control on and off features and an amount of water flow, said water gun being comprised of a water inlet, a water outlet, a water holder between said water inlet and said water outlet, and a control component placed on a predetermined part of said water gun; said water flow control structure comprising:

a control tube, being placed inside said water holder of said water gun, and being rotatable and moveable, said control tube being moved by said control component of said water gun and being moveable down from a first location to a second location, said control tube having a water channel placed inside thereof, said control tube facing an end of said water outlet, said end having a stopper head to stop a water control outlet inside said water holder to shut water flow off, said control tube having a first guide and a second guide placed on an outside thereof;

a stepwise positioning unit, being placed inside said water holder, said stepwise positioning unit being comprised of sets of positioning slots having different heights and an oblique surface of said positioning unit, wherein said first guide of said control tube corresponds to said stepwise positioning unit, when said control tube is at said first location;

an oblique guide, having sets of rings placed inside said water holder, wherein said second guide is guided by said oblique guide when said control tube is moved to a second positioning, making said control tube of said second guide turn to a predetermined angle; and a resilient component, restoring said control tube from a second position to a first position.

2. The structure defined in claim 1, wherein said control component of said water gun comprises a press handle and a linkage lever, said press handle having a top end thereof placed on a top end of a front side of said water gun, a bottom end of said press handle being pressed, said linkage lever being connected to a through hole in a middle of said water gun, said linkage lever being comprised of a vertical rod and two horizontal bars, a middle of said water gun having a through hole for a horizontal bar of said linkage lever to insert, a shoulder being placed on an outside of said control tube for the horizontal bar to place on, said vertical rod moving the horizontal bar when a bottom of said press handle is pressed in, said control tube being moveable from the first position to the second position.

3. The structure defined in claim 1, wherein said control component of said water gun is comprised of a press handle, said press handle being placed on a top of said water gun and being connected with said stopper head of said control tube by going through said water holder of said water gun, said press handle moving said control tube downward when said press handle is lowered.

4. The structure defined in claim 1, wherein said first guide is comprised of two protruding blocks at a 180-degree angle.

5. The structure defined in claim 1, wherein said second guide is comprised of protruding blocks in a circular fashion, a bottom of each block having an oblique surface corresponding to said oblique guide.

6. The structure defined in claim 1, wherein said oblique guide is comprised of a ring base, said ring base being positioned in said water holder.

7. The structure defined in claim 1, wherein said resilient component is comprised of a spring.

* * * * *